United States Patent Office 3,636,206
Patented Jan. 18, 1972

3,636,206
CERTAIN THIOLOPHOSPHONAMIDES AS INSECTI-
CIDES AND ACARICIDES
Edmund J. Gaughan, Kensington, Calif., assignor to
Stauffer Chemical Company, New York, N.Y.
No Drawing. Filed Aug. 16, 1968, Ser. No. 753,050
Int. Cl. A01n 9/36
U.S. Cl. 424—219
20 Claims

ABSTRACT OF THE DISCLOSURE

Compounds of the formula

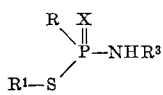

in which R is an alkyl group and $R^1$ is an alkyl, alkenyl or alkynyl group, X is oxygen or sulfur, and $R^3$ is hydrogen alkyl or alkenyl as insecticides and acaricides.

---

This invention relates to the use of certain novel chemical compounds as insecticides and acaricides, more particularly the chemical compounds are certain thiolophosphonamides.

The compounds of the present invention that are useful as insecticides and acaricides are those having the formula

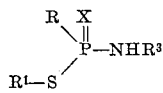

in which R is an alkyl group preferably having 1 to 4 carbon atoms, $R^1$ is a member selected from the group consisting of alkyl preferably having 1 to 6 carbon atoms and the group $R^2$—$CH_2$— in which $R^2$ is selected from the group consisting of alkenyl, preferably having 2 to 3 carbon atoms, and alkynyl, preferably having from 2 to 3 carbon atoms, X is selected from the group consisting of oxygen and sulfur, preferably oxygen, and $R^3$ is selected from the group consisting of hydrogen, alkyl, preferably having 1 to 4 carbon atoms, alkenyl, preferably having 2 to 4 carbon atoms.

The compounds having the formula

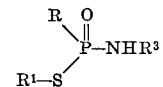

in which R, $R^1$, and $R^3$ are as defined can be prepared by the following reactions:

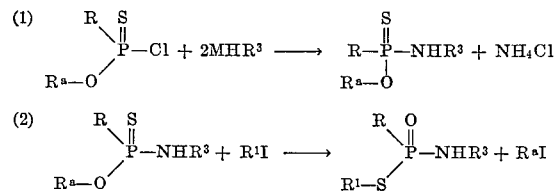

in which R, $R^1$, and $R^3$ are as previously defined and $R^a$ is a lower alkyl group preferably having 1 to 6 carbon atoms.

Preferably, reaction Number 1 is carried out in a solvent with stirring by passing 2 moles of ammonia of the primary amine, or a slight excess thereof, into a mole. of the phosphonochlorido thioate at a temperature of about 10 to 15° C. The intermediate reaction product can be recovered by removing the ammonium chloride or substituted ammonium chloride precipiate by filtration and the solvent by vacuum at temperature up to about 65° C.

Preferably, reaction Number 2 is carried out by refluxing the thiophosphonamide, obtained from reaction Number 1 or from another source, with the stated iodide compound for several hours. The thiolophosphonamides of this invention can be recovered from the reaction mixture and purified by conventional means.

The compounds having the formula

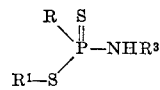

in which R, $R^1$, and $R^3$ are as defined can be prepared by the following reactions:

(1) 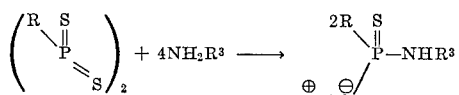

(2) 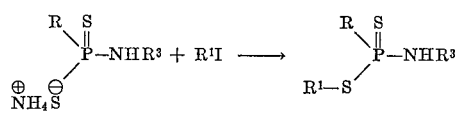

in which R, $R^1$, and $R^3$ are as previously defined.

Preferably reaction Number 1 is carried out using one mole. of the disulfide dimer compound with 4 moles or more of ammonia or the primary amine. The reaction is conveniently carried out by forming a suspension of the disulfide dimer compound in toluene and then adding the suspension to liquid ammonia or primary amine with stirring. After stirring for about 30 minutes, and upon evaporation of the liquid, a solid is obtained.

Preferably in reaction Number 2, the solid obtained from reaction Number 1 is dissolved or suspended in water and then the indicated iodide compound is added and the mixture stirred for about an hour at a temperature of about 35–40° C. The product is recovered by conventional technique, such as extraction of product with ether, then evaporation of the ether.

Preparation of the compounds of this invention is illustrated by the following examples.

EXAMPLE I

O,P-diethylthiophosphonamide

O-ethyl ethyl phosphonochlorido thioate (17.3 g., 0.1 mole) was dissolved in 85 ml. of toluene and ammonia (approx. 4.3 g., approx. 0.25 mole.) passed in at 10–15° with stirring. A precipitate of ammonium chloride appeared. The mixture was filtered and the solvent removed in vacuo up to 65°. The residual oil weighed 12.7 g. (81%). Its IR spectrum showed bonds characteristic of NH and P—O—C bonds $n_D^{30}$ 1.5056.

EXAMPLE II

P-ethyl-S-methylthiolophosphonamide

The above thiophosphonamide (12.7 g., 0.081 mole.) and methyl iodide (13.5 ml. 0.22 mole) were refluxed for five hours. Some solid formed which was removed by filtration. The filtrate was evaporated in vacuo up to 60° and the viscous residue taken up in a mixture of 50 ml. of methylene chloride and 14 ml. of hexane. No further solid was precipitated, so the solvent was removed in vacuo up to 60°. The product, a viscous oil, showed a band at 1175 cm. (strong) attributable to hydrogen bonded P—O bond. A strong hydrogen-bonded NH band was also present. $n_D^{30}$ 1.5507 Yield: 10.5 g. (82.7%).

EXAMPLE III

P,S-diethylthiolophosphonamide

The thiophosphonamide of Example I (22.3 g., .146 mole) and ethyl iodide (60. 1g., .39 mole) were stirred and heated to 70–75° (bath temperature) for five hours. The ethyl iodide was removed in vacuo and the residue taken up in a mixture of 95 ml. of methylene chloride and 25 ml. of hexane. No solid formed and the solvents were evaporated in vacuo. The residue was pumped out at .8 mm. up to 50°. It crystallized upon standing and was recrystallized from cyclohexane containing a little benzene. M.P. 44–46.5°. Yield: 16.7 g. The IR spectrum showed the expected bonds.

*Analysis.*—Calculated for $C_4H_{12}NOPS$ (percent): C, 31.37; H, 7.84; N, 9.15. Found (percent): C, 30.75; H, 7.72; N, 8.60.

EXAMPLE IV

P-ethyl-S-n-propylthiolophosphonamide

The thiophosphonamide of Example I (22.2 g., .145 mole) and n-propyl iodide (59.5 g., .35 mole) were warmed at 80° (bath temperature) for eight hours. Excess iodide was removed in vacuo and the residue taken up in 112 ml. of methylene chloride and 28 ml. of hexane. No solid appeared and the solvents were evaporated in vacuo. The product was recrystallized from benzene-cyclohexane. M.P. 44–49°. Yield: 18.4 g. (82.9%). The expected bonds were present in the IR spectrum.

*Analysis.*—Calculated for $C_5H_{14}NOPS$ (percent): C, 35.93; H, 8.38. Found (percent): C, 35.47; H, 8.11.

EXAMPLE V

S-methyl ethylphosphonamidodithioate

A suspension of

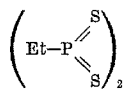

in toluene is added to liquid ammonia slowly with stirring. The reaction is exothermic. After the addition is completed, the mixture is stirred thoroughly. A white solid forms having the structure,

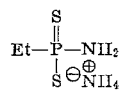

at a yield of 12.2 grams. The IR corresponds to the anticipated structure.

Next the solid product obtained is stirred with 100 ml. $H_2O$ to partially dissolve it. 13.5 grams of methyl iodide is added, and the mixture is stirred for about 1 hour at 35–40° C. The mixture is cooled and the product extracted with ether and the ether thereafter removed by evaporation.

An oil product

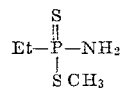

is obtained at a yield of 6.2 grams $n_D^{30}$:1.6120.
IR corresponds to the anticipated structure.

EXAMPLE VI

P-ethyl-S-methyl-N-allylthiolophosphonamide

O-ethyl ethylphosphonochloridothioate (8.6 g., .05 mole) is dissolved in 40 ml. of benzene and a solution of allyl amine (6.3 g., .11 mole) in 20 ml. of benzene is added at 10–15°. The mixture is stirred at room temperature for 1.5 hours and at 55–60° for 1 hour. The amine hydrochloride is filtered off and the filtrate evaporated in vacuo after washing with ice water and drying over magnesium sulfate. A yield of 9.5 g. (99%) O,P-diethyl-N-allylthiophosphonamide $n_D^{30}$ 1.4984 is realized. The O,P-diethyl-N-allylthiophosphonamide product (9.5 g., 0.049 moles) is mixed with methyl iodide (24.6 g., .173 moles) and refluxed for 5 hours. The excess methyl iodide is removed in vacuo and the residue is taken up in a mixture of 40 ml. of methylene dichloride and 10 ml. of hexane and filtered. Removal of the solvent left 8.2 g. (94%) of product $n_D^{30}$ 1.5149. The IR spectrum showed the expected bands.

The following is a table of certain selected compounds that are preparable according to the procedure described hereto. Compound numbers are assigned to each compound and are used throughout the remainder of the application.

TABLE I

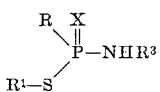

| Compound number | R | R₁ | X | R₃ |
|---|---|---|---|---|
| 1ᵃ | Ethyl | Methyl | O | H. |
| 2ᵇ | do | Ethyl | O | H. |
| 3 | Methyl | Methyl | O | H. |
| 4 | n-Butyl | do | O | H. |
| 5 | Ethyl | Isopropyl | O | H. |
| 6ᶜ | do | n-Propyl | O | H. |
| 7 | Methyl | Hexyl | O | H. |
| 8 | Ethyl | Allyl | O | H. |
| 9 | Methyl | CH₂—CH—CH₂=CH₂ | O | H. |
| 10 | Ethyl | CH₃—CH=CH=CH₂ | O | H. |
| 11 | do | CH :C—CH₂—CH₂ | O | H. |
| 12 | do | CH C—CH₂ | O | H. |
| 13 | do | CH₃—C≡C—CH₂— | O | H. |
| 14ᵈ | do | Methyl | S | H. |
| 15 | Butyl | Allyl | S | Methyl. |
| 16 | Ethyl | Methyl | O | n-Propyl. |
| 17 | do | do | O | Methyl. |
| 18ᵉ | do | do | O | Allyl. |
| 19 | do | do | O | Vinyl. |

ᵃPrepared in Example II.
ᵇPrepared in Example III.
ᶜPrepared in Example IV.
ᵈPrepared in Example V.
ᵉPrepared in Example VI.

The following tests illustrate utility of the compounds as insecticides and acaricides.

Insecticidal evaluation tests

The following insect species were used in evaluation tests for insecticidal activity:

(1) Housefly (HF)—*Musca domestica* (Linn.)
(2) German roach (GR)—*Blatella germanica* (Linn.)
(3) Milkweed bug (MWB)—*Oncopeltus fasciatus* (Dallas)
(4) Lygus bug (LB)—*Lygus hesperus* (Knight)
(5) Bean aphid (BA)—*Aphis fabae* (Scop.)

The Housefly (HF) was used in evaluation tests of selected compounds as insecticides by the following procedure. A stock solution containing 100 μg./ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg. per Petri dish to that at which 50% mortality was attained. The Petri dishes were placed in a circular cardboard cage, closed on the bottom with cellophane and covered on top with cloth netting. Twenty-five female houseflies, three to five days old, were introduced into the cage and the percent mortality was recorded after 48 hours. The LD–50 values are expressed in terms of Ug. per 25 female flies. The results of this insecticidal evaluation test are given in Table II under "HF."

In the German cockroach (GR) and Milkweed Bug (MWB) tests, 10 one-month old nymphs of the German Cockroach (GR), and two-week old nymphs of Milkweed bug (MWB) were placed in separate circular cardboard cages sealed on one end with cellophane and covered by a cloth netting on the other. Aliquots of the toxicants, dissolved in an appropriate solvent, were diluted in water containing 0.002% of a wetting agent, Sponto 221®—(a polyoxyether of alkylated phenols blended with organic sulfonates). Test concentrations ranged from 0.1% downward to that at which 50% mortality was obtained. Each of the aqueous suspensions of the candidate compounds were sprayed onto the insects through the cloth netting by means of a hand spray gun. Percent mortality in each case recorded after 72 hours, and the LD–50 values expressed as percent of toxicant in the aqueous spray was recorded. These values are reported under the columns "GR" and "MWB" in Table II.

The Lygus bug (LB) *Lygus hesperus* was tested similarly as the German cockroach and milkweed bug, except ten to twenty-five insects were used per cage. The caged insects were sprayed with the candidate compounds at concentrations ranging from 0.05% downward to that at which 50% mortality was obtained. After twenty-four and seventy-two hours, counts were made to determine living and dead insects. The LD–50 (percent) values were calculated. These values are reported under the column "LB" in Table II.

The insect species black bean aphid (BA) *Aphis fabae* (Scop.)—was also employed in the test for insecticidal activity. Young nasturtium (*Tropaeolum* sp.) plants, approximately 2 to 3 inches tall, were used as the host plants for the bean aphid. The host plant was infested with approximately 50–75 of the aphids. The test chemical was dissolved in acetone, added to water which contained a small amount of Sponto 221®, an emulsifying agent. The solution was applied as a spray to the infested plants. Concentrations ranged from 0.05 percent downward until an $LD_{50}$ value was achieved. These results are given in Table II under the column "BA."

Acaricidal evaluation test

The two-spotted mite (2SM), *Tetranychus urticae* (Koch), was employed in tests for miticides. Young pinto bean plants or lima bean plants (Phaseolus sp.) in the primary leaf stage were used as the host plants. The young pinto bean plants were infested with about 100 mites of various ages. Dispersions of candidate materials were prepared by dissolving 0.1 gram in 10 ml. of a suitable solvent, usually acetone. Aliquots of the toxicant solutions were suspended in water containing 0.002% v./v. Sponto 221®, polyoxy-ethylene ether sorbitan monolaurate, an emulsifying agent, the amount of water being sufficient to give concentrations of active ingredient ranging from 0.05% to that at which 50% mortality was obtained. The test suspensions were then sprayed on the infested plants to the point of run off. After seven days, mortalities of postembryonic and ovicidal forms were determined. The percentage of kill was determined by comparison with control plants which had been sprayed with the candidate compounds. The LD–50 value was calculated using well-known procedures. These values are reported under the columns "2SM–PE" and "2SM–Eggs" in Table II.

Systemic evaluation test

This test evaluates the root absorption and upward translocation of the candidate systemic compound. The two-spotted mite (2SM), *Tetracyshus urticae* (Koch), and the bean aphid (BA), *Aphis fabae* (Scop.) were employed in the test for systemic activity.

Young pinto bean plants in the primary leaf stage were used as host plants for the two-spotted mite. The pinto bean plants were placed in bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.) Immediately after the host plant was placed in the test solution it was infested with the test species. Mortalities were determined after seven days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an LD–50 value was obtained. Mortality was recorded after 72 hours.

The percentage of kill of each test species was determined by comparison with control plants placed in distilled water or untreated soil. The LD–50 values were calculated. These systemic test results are reported in Table II under the columns "BA–sys" and "2SM–sys."

TABLE II.—$LD_{50}$ VALUES

| Compound number | HF, ug. | GR, percent | MWB, percent | LB, percent | BA, percent | BA-sys., p.p.m. | 2 SM PE, percent | 2 SM Eggs, percent | 2 SM Sys., p.p.m. |
|---|---|---|---|---|---|---|---|---|---|
| 1 | 0.7 | .03 | .03 | .005 | .003 | 0.8 | .003 | .03 | 1.5 |
| 2 | 0.3 | .03 | .03 | .003 | .008 | 0.3 | .001 | .03 | 0.5 |
| 5 | 1 | .08 | .03 | .003 | .003 | 0.3 | .001 | .03 | 0.8 |
| 6 | 1 | >.1 | .03 | .005 | .003 | 0.3 | .0008 | .003 | 0.3 |
| 8 | 0.5 | .03 | .03 | .03 | .001 | 0.4 | .001 | .01 | 3.0 |
| 12 | 3 | .05 | .08 | .03 | .008 | 3 | .01 | >.05 | 3 |
| 14 | 30 | >.1 | >.1 | >.05 | >.05 | — | .03 | .03 | 8 |
| 16 | 70 | >.1 | >.1 | >.05 | >.05 | — | .005 | .03 | 3 |
| 18 | 30 | >.1 | >.1 | >.05 | >.05 | — | >.05 | >.05 | — |

—=not tested.

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthelene sulfonate, sodium alkyl naphalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

I claim:

1. The method of controlling acarids comprising applying thereto an acardicidally effective amount of a compound of the formula

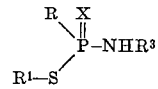

in which R is alkyl group having 1 to 4 carbon atoms, $R^1$ is a member selected from the group consisting of alkyl having 1 to 6 carbon atoms and the group $R^2$—$CH_2$— in which $R^2$ is selected from the group consisting of alkenyl having 2 to 3 carbon atoms and alkynyl having 2 to 3 carbon atoms, X is selected from the group consisting of oxygen and sulfur and $R^3$ is selected from the group consisting of hydrogen, alkyl having 1 to 4 carbon atoms, and alkenyl having 2 to 4 carbon atoms.

2. The method of claim 1 in which $R^1$ is alkyl having 1 to 6 carbon atoms, X is oxygen and $R^3$ is hydrogen.

3. The method of claim 1 in which $R^1$ is the group $R^2\text{—CH}_2\text{—}$ in which $R^2$ is alkenyl having 2 to 3 carbon atoms, X is oxygen and $R^3$ is hydrogen.

4. The method of claim 1 in which $R^1$ is the group $R^2\text{—CH}_2\text{—}$ in which $R^2$ is alkynyl having 2 to 3 carbon atoms, X is oxygen and $R^3$ is hydrogen.

5. The method of claim 2 in which R is ethyl, $R^1$ is methyl.

6. The method of claim 2 in which R is ethyl, $R^1$ is ethyl.

7. The method of claim 2 in which R is ethyl and $R^1$ is isopropyl.

8. The method of claim 2 in which R is ethyl and $R^1$ is n-propyl.

9. The method of claim 3 in which R is ethyl and $R^1$ is allyl.

10. The method of claim 4 in which R is ethyl and $R^1$ is propargyl.

11. The method of controlling insects comprising applying to the habitat thereof an insecticidally effective amount of a compound of the formula

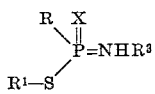

in which R is alkyl group having 1 to 4 carbon atoms, $R^1$ is a member selected from the group consisting of alkyl having 1 to 6 carbon atoms and the group $R^2\text{—CH}_2\text{—}$ in which $R^2$ is selected from the group consisting of alkenyl having 2 to 3 carbon atoms and alkynyl having 2 to 3 carbon atoms, X is selected from the group consisting of oxygen and sulfur and $R^3$ is selected from the group consisting of hydrogen, alkyl having 1 to 4 carbon atoms and alkenyl having 2 to 4 carbon atoms.

12. The method of claim 11 in which $R^1$ is alkyl having 1 to 6 carbon atoms, X is oxygen and $R^3$ is hydrogen.

13. The method of claim 11 in which $R^1$ is the group $R^2\text{—CH}_2\text{—}$ in which $R^2$ is alkenyl having 2 to 3 carbon atoms, X is oxygen and $R^3$ is hydrogen.

14. The method of claim 11 in which $R^1$ is the group $R^2\text{—CH}_2\text{—}$ in which $R^2$ is alkenyl having 2 to 3 carbon atoms, X is oxygen and $R^3$ is hydrogen.

15. The method of claim 12 in which R is ethyl and $R^1$ methyl.

16. The method of claim 12 in which R is ethyl and $R^1$ is ethyl.

17. The method of claim 12 in which R is ethyl and $R^1$ is isopropyl.

18. The method of claim 12 in which R is ethyl and $R^1$ is n-propyl.

19. The method of claim 13 in which R is ethyl and $R^1$ is allyl.

20. The method of claim 14 in which R is ethyl and $R^1$ is propargyl.

References Cited

UNITED STATES PATENTS 3,309,266   3/1967   Magee _____ 260—959 X

ALBERT T. MEYERS, Primary Examiner

L. SCHENKMAN, Assistant Examiner

U.S. Cl. X.R.

424—220

PO-1050
(5/69)

UNITED STATES PATENT OFFICE
CERTIFICATE OF CORRECTION

Patent No. 3,636,206     Dated January 18, 1972

Inventor(s) Edmund J. Gaughan

It is certified that error appears in the above-identified patent and that said Letters Patent are hereby corrected as shown below:

Column 1, line 50, Formula No. (1) should read:

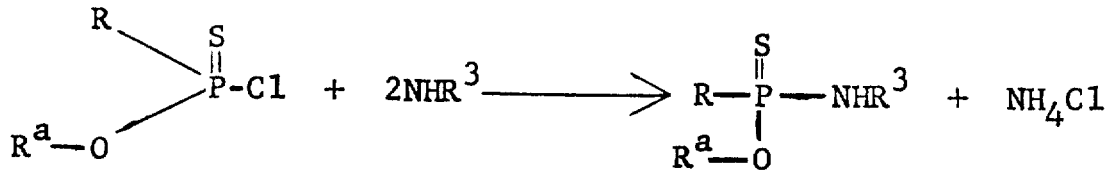

Column 1, line 66, "precipiate" should read ---Precipitate---

Column 4, Table I, Compound No. 9, "$CH_2=CH-CH_2\equiv CH_2$" should read ---$CH_2=CH-CH_2-CH_2-$---

Column 4, Table I, Compound No. 10, "$CH_3-CH=CH\equiv CH_2$" should read --- $CH_3-CH=CH\equiv CH_2-$ ---

Column 4, Table I, Compound No. 11, "CH  C—$CH_2$—$CH_2$" should read ---$CH\equiv C-CH_2-CH_2-$ ---

Column 4, Table I, Compound No. 12, "CH  C—$CH_2$" should read --- $CH\equiv C-CH_2-$ ---

Column 5, line 58, "which had been sprayed" should read ---which had not been sprayed---

Column 6, line 72 "R is alkyl" should read ---R is an alkyl---

Column 7, Claim 11, the Formula should read:

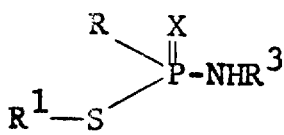

Column 8, Claim 15, line 15, "$R^1$ methyl." should read ---$R^1$ is methyl.---

Signed and sealed this 26th day of September 1972.

(SEAL)
Attest:

EDWARD M.FLETCHER,JR.
Attesting Officer

ROBERT GOTTSCHALK
Commissioner of Patents